O. E. DUFFEY.
BEET HARVESTER.
APPLICATION FILED NOV. 22, 1907.
952,669.
Patented Mar. 22, 1910.
3 SHEETS—SHEET 2.
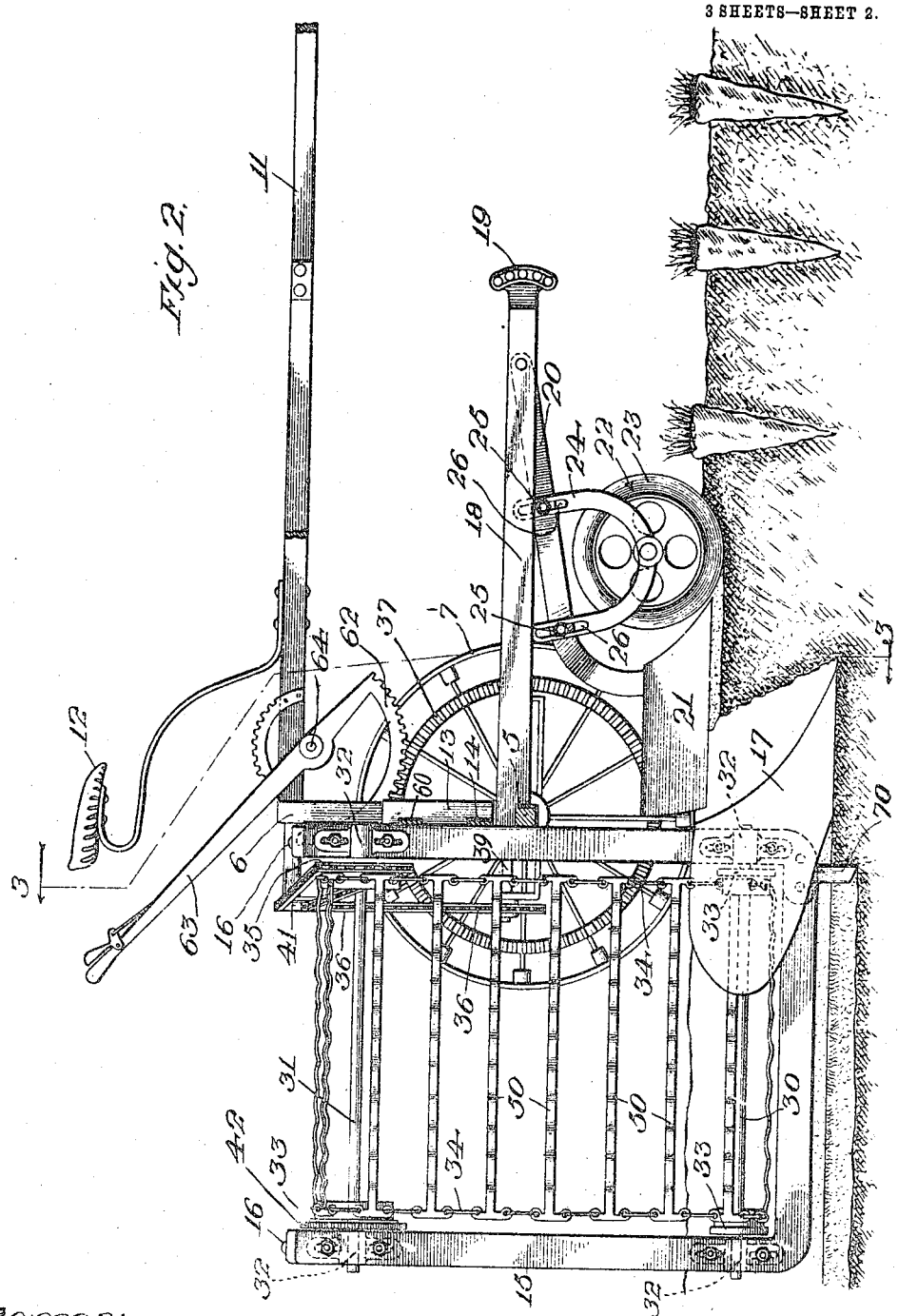

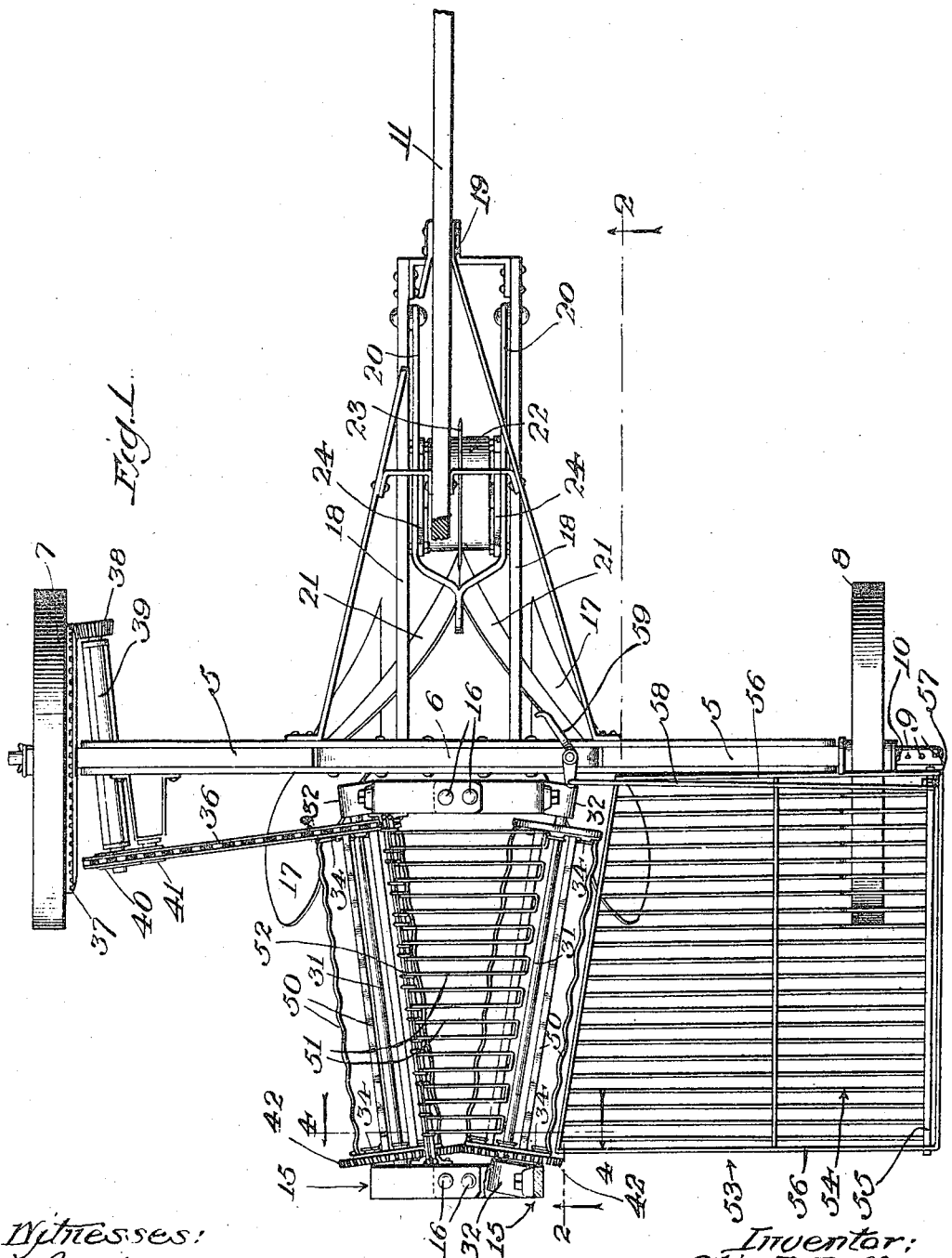

O. E. DUFFEY.
BEET HARVESTER.
APPLICATION FILED NOV. 22, 1907.
952,669.
Patented Mar. 22, 1910.
3 SHEETS—SHEET 3.
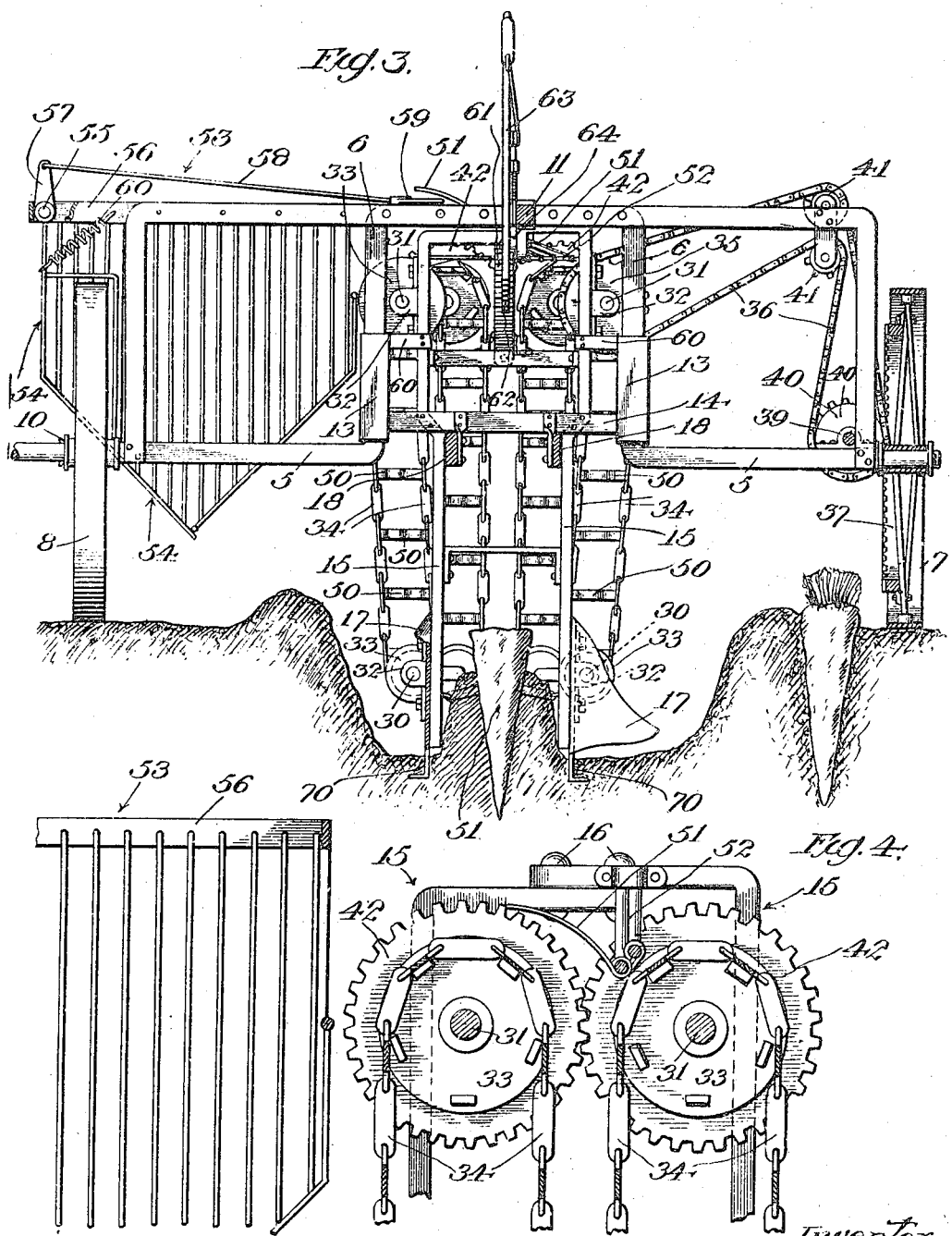
Witnesses:
Inventor.
Otis E. Duffey,
By 
Attorneys

UNITED STATES PATENT OFFICE.

OTIS E. DUFFEY, OF LOS ANGELES, CALIFORNIA.

BEET-HARVESTER.

952,669.  Specification of Letters Patent.  Patented Mar. 22, 1910.

Application filed November 22, 1907. Serial No. 403,252.

*To all whom it may concern:*

Be it known that I, OTIS E. DUFFEY, a citizen of the United States, residing at Los Angeles, in the county of Los Angeles and State of California, have invented new and useful Improvements in Beet-Harvesters, of which the following is a specification.

My invention relates to a harvester adapted to harvest sugar beets and the like and the prime object thereof is to provide a machine which will perform all the necessary operations preparatory to removing the beets from the field, placing the beets in condition for immediate use at the sugar factory.

In pursuance of the above object it is an object to provide a machine which will first top the beets as they stand in the soil and then gather them from the soil and place them in a convenient receptacle.

A further object is to provide a machine which may be easily operated by a pair of horses and one man, the mechanism being so constructed as to make a light and easily operated harvester.

I accomplish these objects by means of the device described herein and illustrated in the accompanying drawings, in which:—

Figure 1,—is a plan view of my improved harvester, parts being broken away for clear illustration. Fig. 2,—is a sectional side elevation of the same taken on line 2—2 of Fig. 1. Fig. 3,—is a cross sectional elevation taken on line 3—3 of Fig. 2. Fig. 4,—is a sectional detail of a portion of the pulling mechanism taken on line 4—4 of Fig. 1.

Referring to the drawings 5 designates an axle frame which is constructed with an inverted U shaped portion 6 at its center as shown in Fig. 3. This axle is provided with supporting wheels 7 and 8 on its ends, wheel 7 being mounted in the usual manner on the axle and wheel 8 being adjustably mounted on the same by means of holes 9 in which cotter pin 10 may be placed to vary the width between the wheels so that they may be adjusted to avoid the rows of beets in passing over the field. Secured to the top of the axle frame is a tongue 11 by means of which the machine may be guided by the horses drawing the same in the usual manner. A seat 12 for the driver is mounted on tongue 11 in a convenient position to manipulate the levers of the machine.

Slidably mounted on the upright portions of the axle are two sleeves 13 connected together at their lower ends by a bar 14 which is also secured to and supports a pair of longitudinal and vertical frames 15 extending rearwardly from the axle and each of U shape as shown most clearly in Fig. 2. These frames are both turned inwardly at their upper ends as shown in Fig. 4 and secured together by means of rivets 16 or any other suitable fastening. Frames 15 extend below the surface of the ground on which wheels 7 and 8 rest, as shown in Fig. 3, so as to carry the pulling mechanism which is mounted on them to a point below the surface of the ground in order that the beets may be engaged by the same.

On the lower ends of frames 15 are mounted plow shares 17 which are spaced apart by the position of the frames just a sufficient distance to turn the soil on each side of a row of beets and as closely to the same as possible, as shown in Fig. 3. These shares leave the beets standing in a ridge of soil where they may be readily grasped and removed by the pulling mechanism.

Mounted on each frame 15 is a draft tongue 18 which extends forwardly a suitable distance and has affixed to its outer end a clevis 19 to which the horses are hitched. Pivotally mounted on these draft tongues and at their forward ends is a rearwardly extending cutter frame 20 which curves downwardly and carries on its rear end a V shaped cutter 21 formed of two cutting oblique blades meeting in a point at their forward ends as shown in Fig. 1.

Adjustably mounted on cutter frame 20 directly in front of cutter 21 is a rolling colter 22 which is formed with a central radial cutting flange 23 adapted to cut the soil as deep as its projection beyond the cylindrical parts of the colter and also to cut the beets which it passes over. This colter is mounted in U shaped frames 24 which are adjustably mounted on cutter frame 20 by means of bolts 25 working in slots 26 in frame 24. By means of this adjustability the colter may be moved vertically to guide cutter 21 so that it will remove just a sufficient amount from the top of the beets, the cylindrical portions of the colter holding the same above the surface and raising cutter frame 20 whenever it passes over a beet. The cutting flange of the colter passes through the beets and splits the tops of the same as deep as cutter 21 will cut after it so as to afford a start for the cutter as its V shaped point enters the beet. From Fig. 1 it will be observed that the tops of the beets after being cut are shoved to both sides of the machine out of the way of the plows and pulling mechanism which follow directly behind the cutter, the cutter being made long enough to accomplish this purpose.

Mounted on each of frames 15 at the top and bottom thereof is a lower and an upper shaft 30 and 31 which shafts are journaled in bearings 32 mounted directly on the frames. As most clearly shown in Fig. 1 the bearings for the front ends of the shafts are mounted on the outside of the frames while the ones for the rear ends are mounted on the inside. This system gives to the shafts an oblique direction so that they are considerably closer together at their rear ends than at their front ends. Mounted on each end of each of the shafts is a disk 33, the disks on the upper shafts being preferably larger than the lower ones. Over these disks two pairs of chains 34 are adapted to be driven, one of the upper shafts being driven by means of a sprocket wheel 35 mounted on its forward end and a sprocket chain 36 which connects the pulling mechanism with a gear 37 mounted on supporting wheel 7. A small pinion 38 mounted on a short shaft 39 meshes with gear 37 and shaft 39 carries a sprocket wheel 40 over which sprocket chain 36 is adapted to pass. The chain passes upwardly from the sprockets to a pair of small idlers 41 and thence horizontally to sprocket 35 on shaft 31. The rear ends of both of shafts 31 are provided with intermeshing gears 42 so that both the upper shafts are driven together. The lower shafts are driven from the upper shafts by the passage of chains 34 over the same. Mounted on each of the links of the chain and connecting the front and rear chains together are a series of preferably corrugated bars 50 which are adapted to pass around the upper and lower shafts with the chain. From Fig. 3 it will be noted that the bars are thus carried to a point beneath the ground directly behind the plows where they may engage with a beet situated as at 51 and on their upward movement will pull the beet from the ground and move it upwardly between the two sets of corrugated bars to the top of the machine. It will be noted that the corrugated bars approach each other at their rear ends so that beets of any and all sizes may be engaged by the same, a beet of large size being carried up near the front ends of the pulling mechanism and a beet of small size being carried up nearer the rear end of the same. The bars are corrugated to prevent the beets from slipping forwardly and falling to the ground. Upon reaching the top of the pulling mechanism the beets encounter a series of guards 51 preferably constructed of resilient wire. These guards are hung from a pair of rods 52 which are mounted on frames 15 as illustrated in Fig. 4 and project from a point near one of the sets of chains and corrugated bars to a point over the other set of the same. When a beet encounters these guards it is thereby forced away from the right hand set in Fig. 4 and is held in engagement with the other set of corrugated bars, being thus compelled to travel over left hand shaft 31 and to fall into a basket 53 which is arranged directly alongside of that shaft. This basket may be constructed in any suitable manner and of any suitable material, a basket of steel wire and with a V shaped bottom being illustrated. The whole outer side and bottom 54, which is also constructed of steel wire, is secured to and hinged upon a rod 55 which is revolubly mounted in frame 56 of the basket, this frame being secured in any suitable manner to the main frame of the machine. A small arm 57 is rigidly mounted on shaft 55 and a rod 58 connects the outer end of this arm with a foot lever 59 mounted on the axle frame of the machine. A spring 60 is adapted to hold the outer side and bottom of the basket normally in its closed position and upon the basket becoming filled with beets foot lever 59 is pressed upon by the operator and the beets allowed to slide out of the basket in a pile on the ground.

As before described sleeves 13 are slidably mounted on the upright portions of the axle frame and are connected to puller frames 15 by a transverse bar 14 near the lower end of the sleeves. At their upper ends the sleeves are also connected to the frames by means of short straps 60 so that the frames and sleeves are held rigidly together. Mounted between the frames as shown in Fig. 3 and connected rigidly thereto is a rack 61 with which a sector 62 mounted on hand lever 63 is adapted to engage. This hand lever is pivotally mounted at 64 on tongue 11 and is provided with the usual ratchet stop device to hold it in any desired position. By means of this lever the puller frames and the pulling mechanism mounted thereon may be lifted out of the ground when it is desired to pass over the same without doing any work and then may be subsequently lowered when it is desired to begin operation on the beets.

In the operation of my device the harvester is drawn up and down the rows of beets in the field. As the machine passes along the beets are first topped by means of the rolling colter and the cutter behind the same in the manner hereinbefore described. The plows which immediately follow after the topping devices then throw the soil away from each side of the row of beets leaving the beets standing in a ridge of soil which is just wide enough to hold the largest sized beets. This ridge of soil is broken up to a certain extent by the passage of the plows on each side of it but to further aid in this operation I have provided a pair of soil cutting bars 70 which are bent at right angles on their lower ends at a point some distance below the plows. These cutters are sharpened at their forward edges as shown in Fig. 2 so that they also have a lifting action on the soil under which they pass and thus tend to loosen the same so as to facilitate the ready removal of the beets from the remaining ridge of soil. Following immediately behind the plows and in the furrows made thereby the pulling mechanism comes in contact with the beets. This pulling mechanism is geared so that its motion upwardly is about equal to or slightly greater than the forward motion of the machine. The beets are lifted out of the soil by this mechanism and are placed in basket 53 as before described. In working a beet field the basket is always kept on the side which has been worked so that the beets may be dumped therefrom in a position where they will not be passed over again by the machine.

From the foregoing description it will be observed that I have provided a machine which will at one operation remove the beets from the soil and place them in condition for final removal from the field.

The draft of my machine will be seen to be light as it is only necessary to remove the soil as deep as the average beet. The other portions of the mechanism such as the topping and pulling devices do not require much power for their operation. It will further be noted that my machine requires the services of but a single man for its operation as the only additional duty to driving the team is that of periodically dumping the beets. This machine may also be made to operate on more than one row of beets at one time by simply multiplying the mechanism. In case of a large machine it is also desirable to drive the same by power instead of horses.

Having described my invention what I claim as new and desire to secure by Letters Patent is:—

1. In a beet harvester, a beet pulling mechanism comprising a frame adapted to project below the surface of the ground, pairs of shafts journaled at the top and bottom of said frame, said shafts of each pair being arranged to approach each other at their rear ends; disks rigidly mounted on said shafts; chains adapted to pass over said disks and between the upper and lower pairs of shafts; transverse rods connecting between said chains to form a continuous belt; and means to rotate said shafts.

2. In a beet pulling mechanism, a pair of opposed beet pulling belts composed of opposed sets of lateral chains, and corrugated bars transversely connecting the chains of said sets together.

3. A beet pulling mechanism comprising a pair of vertical belts converging toward each other in a horizontal plane, said belts being corrugated vertically.

4. A beet pulling mechanism comprising a pair of approximately vertically moving and laterally converging belts, said belts being corrugated vertically.

5. A beet pulling mechanism, comprising a pair of substantially vertical belts converging toward each other in a horizontal plane, said belts comprising flexible edge members, and a plurality of corrugated connecting bars between said edge members.

In witness that I claim the foregoing I have hereunto subscribed my name this 9th day of November, 1907.

OTIS E. DUFFEY.

Witnesses:
 EDMUND A. STRAUSE,
 OLLIE PALMER.